US007199797B2

(12) United States Patent
Cheng (10) Patent No.: US 7,199,797 B2
(45) Date of Patent: Apr. 3, 2007

(54) SILHOUETTE-ORIENTED GRAY FONT GENERATION

(75) Inventor: Kuo-Young Cheng, Taichung Hsien (TW)

(73) Assignee: DynaComware, Taipei (TW)

( * ) Notice: Subject to any disclaimer, the term of this patent is extended or adjusted under 35 U.S.C. 154(b) by 109 days.

(21) Appl. No.: 11/010,462

(22) Filed: Dec. 13, 2004

(65) Prior Publication Data

US 2006/0125829 A1 Jun. 15, 2006

(51) Int. Cl.
*G06T 11/00* (2006.01)
*G09G 5/26* (2006.01)

(52) U.S. Cl. .................... 345/470; 345/472.3
(58) Field of Classification Search ............... 345/467, 345/468, 469, 469.1, 470, 471, 472.3
See application file for complete search history.

(56) References Cited

U.S. PATENT DOCUMENTS 5,257,344 A * 10/1993 Sasaki et al. ............... 385/110
5,852,448 A * 12/1998 Cheng ........................ 345/469
6,151,025 A * 11/2000 Yen et al. .................... 345/418
2006/0017731 A1 * 1/2006 Matskewich et al. ....... 345/467

* cited by examiner

*Primary Examiner*—Ryan Yang
(74) *Attorney, Agent, or Firm*—Christensen O'Connor Johnson Kindness PLLC (57) ABSTRACT

A method, computer graphical user interface tool, and computer-readable medium for generating a set of characters for display in gray scale are provided, wherein each character comprises one or more strokes/glyphs, and each stroke/glyph is defined in silhouette-oriented representation. The method includes generally six steps. First, a set of characters is displayed, wherein each character comprises one or more strokes/glyphs, and all of the strokes/glyphs are represented by a set of basic strokes/glyphs, each basic stroke/glyph topographically representing a set of similarly-shaped strokes/glyphs. Second, each basic stroke/glyph is defined in silhouette-oriented representation. Third, each stroke/glyph forming each character is defined in silhouette-oriented representation. Fourth, the set of characters is rendered in gray scale. Fifth, the proper appearance of the characters is verified. Sixth, if the appearance is not satisfactory, the method returns to the second step and repeats the subsequent steps until the proper appearance of the characters is verified.

14 Claims, 10 Drawing Sheets

SILHOUETTE-ORIENTED GRAY FONT GENERATION

FIELD OF THE INVENTION

The present invention relates to digital representations of typographic characters or other symbols, and more particularly, to a system, method, and computer-readable medium for generating silhouette-oriented gray fonts.

BACKGROUND OF THE INVENTION

Many font generating systems exist for generating Asian character fonts ("Asian fonts"). An Asian font is composed of a large number of ideographs that represent the characters in the Asian language. Asian languages may include thousands of characters. For example, the Chinese language includes over twenty-thousand distinct characters.

One conventional computer technique for generating character patterns in an Asian font uses font outlines. This system is described in "PostScript Language Tutorial and Cookbook" by Adobe Systems, Inc. (Addison-Wesley Publishing, 1985). In this method, the outline of a character pattern is stored as a collection of straight lines and curves. There are some disadvantages associated with this technique. First, because different font outlines must be defined and stored for tens of thousands of different characters, the memory requirement is relatively high. Second, the font outlines that are stored in high resolution are suited for display only in high resolution; they are not suited for high-quality display in relatively low resolution.

Another method of generating an Asian font uses stroke-based character pattern data, wherein each stroke within a character is separately defined. A character typically consists of multiple strokes that overlap or intersect with each other. The stroke-based character data consist of key points, width values, feature points, and curve ratios, which together define the outline of each stroke. The construction and rendering of the stroke-based character data are described in detail in U.S. Pat. Nos. 5,852,448, 6,151,032, and 6,157,390, which are explicitly incorporated by reference herein. The stroke-based technique is suited for reducing the memory requirements for fonts. Further, the stroke-based character font can be adjustably displayed, always in high quality, in both high resolution and low resolution.

Yet another method of generating an Asian font uses glyph-based character pattern data, wherein each glyph within a character is separately defined. An Asian character typically consists of one or more glyphs, each of which in turn consists of one or more strokes. For example, several strokes in a character that intersect or overlap with each other often create a complicated overall geometric shape, which is a glyph. In the glyph-based technique, each glyph is defined in terms of key points, width values, feature points, and curve ratios, as in the stroke-based technique described above. The construction and rendering of the glyph-based character pattern data are described in detail in U.S. Pat. Nos. 6,501,475 and 6,661,417, which are explicitly incorporated by reference herein.

With the advent of the panel display technology, text can now be displayed as a gray level image on the screen of a cellular phone, PDA, and other electronic devices. Previously, characters were rendered on a binary-image dot matrix screen, which displayed each pixel as either black or white. On the other hand, a gray level screen is capable of displaying each pixel at any gray level (or gray value) ranging from black (0) through white (255). Rendering those characters defined for a binary-image screen on a gray level screen often causes severe degradation of the resulting text image. This is particularly true with Asian characters, which tend to have relatively more complicated overall geometric shapes. For example, FIG. 1D illustrates a Chinese character 9. FIG. 1E illustrates a typical method of rendering a portion 12 of the character 9 on a gray level screen. FIG. 1E illustrates four pixels 16a–16d, on which the portion 12 of the character 9 falls. Referring to the pixel 16b, an area A1 occupied by the character 9 and an area A2 unoccupied by the character 9 are calculated. Then, the gray value for the pixel 16b can be calculated as follows:

$$\text{Gray Value} = (A1 \times \text{black} + A2 \times \text{white})/(A1+A2) \quad \text{(Equation 1)}$$

Figure 1A:
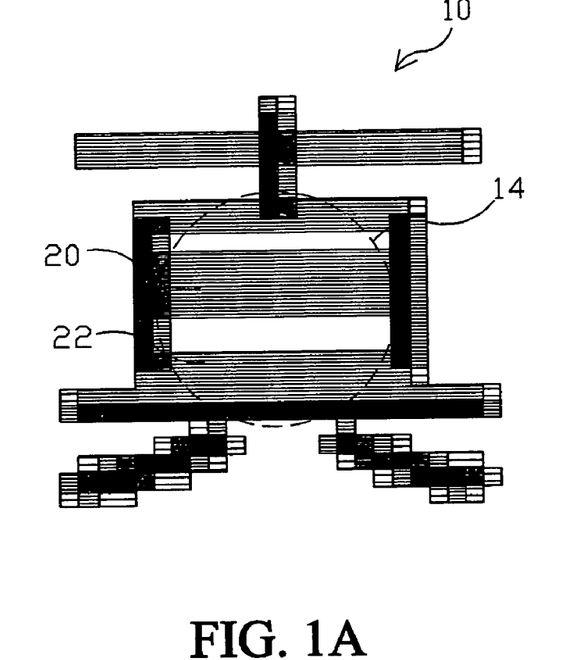
FIGS. 1A–1E illustrate a challenge encountered in rendering an Asian character font, which was defined for rendering on a conventional binary-image dot matrix screen, on a gray level screen.
Figure 1B:
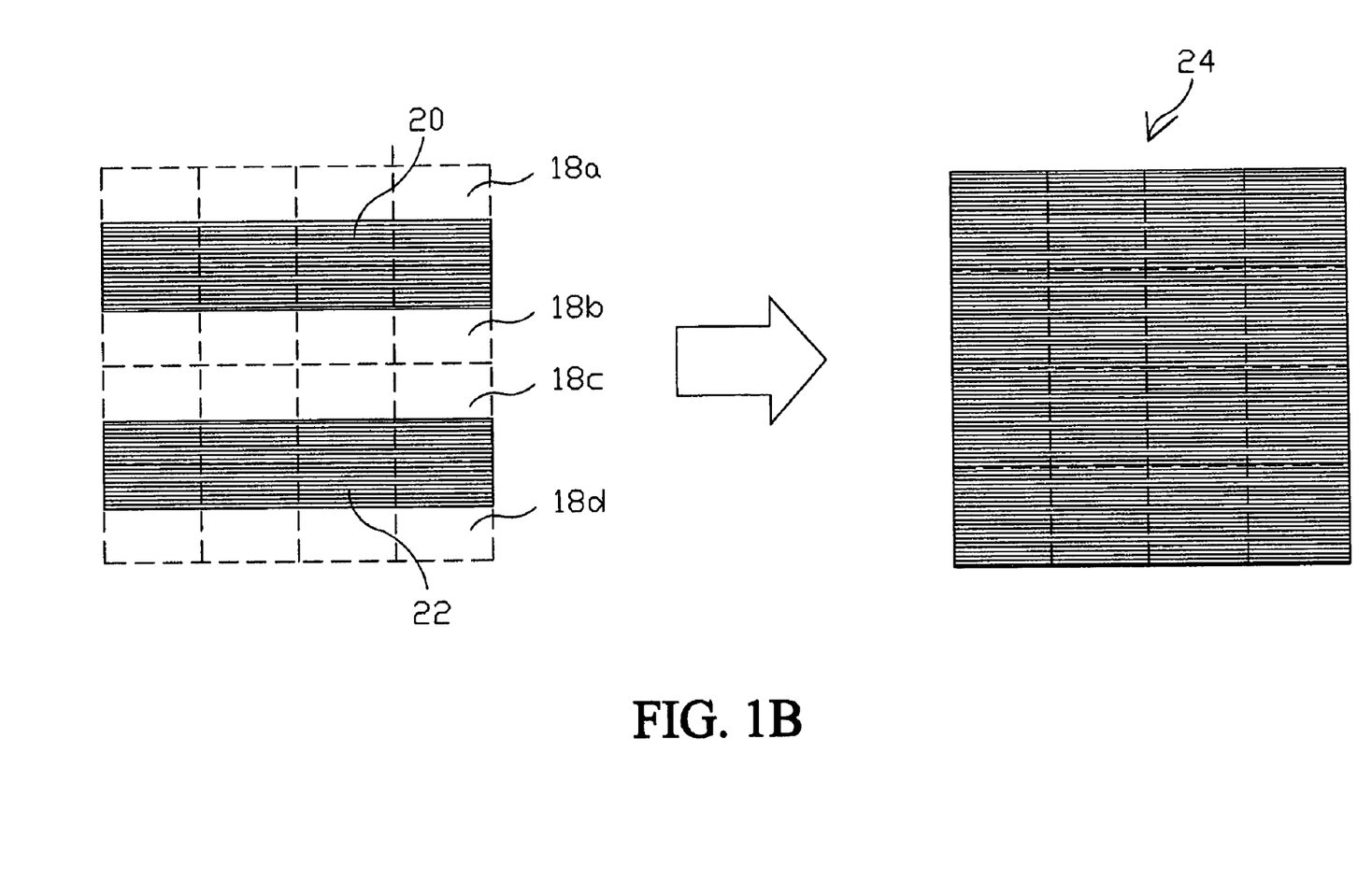

In the present description, a calculation to obtain a gray value for a particular pixel, such as Equation 1 above, is termed a "gray value calculation." FIGS. 1A and 1B illustrate the application of Equation 1 to render a portion 14 of a character 10, including strokes 20 and 22, on a gray level screen. FIG. 1B depicts sixteen (4×4) pixels in four rows 18a–18d, on which the portion 14 of the character including the strokes 20 and 22 falls. As illustrated, the stroke 20 occupies the lower 50% of the pixel row 18a and the upper 50% of the adjacent pixel row 18b. Likewise, the stroke 22 occupies the lower 50% of the pixel row 18c and the upper 50% of the adjacent pixel row 18d. Accordingly, the gray value for each of the four pixel rows 18a–18d is calculated to be the same value as follows:

$$\text{Gray Value} = 0.5 \times \text{black} + 0.5 \times \text{white} \quad \text{(Equation 2)}$$

Figure 1C:
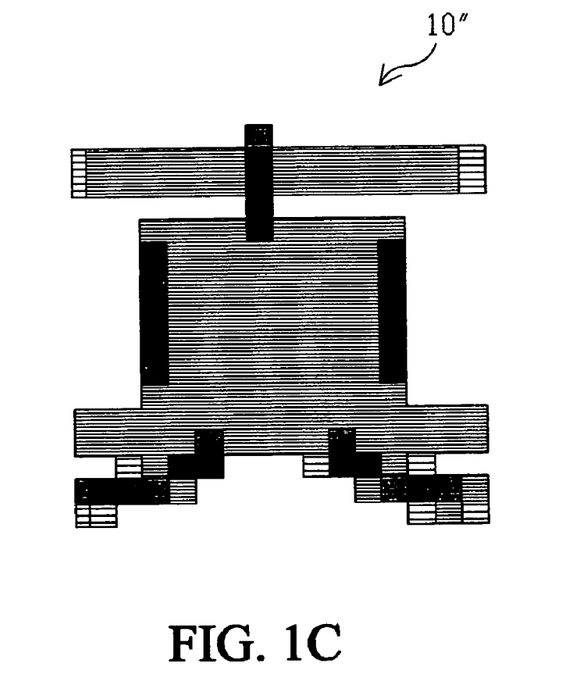
Figure 1D:
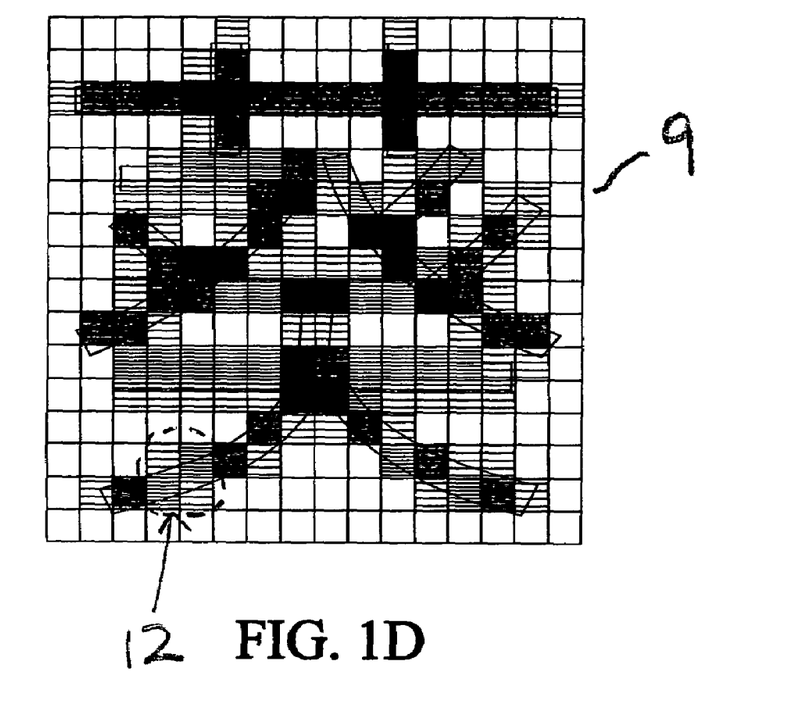
Figure 1E:
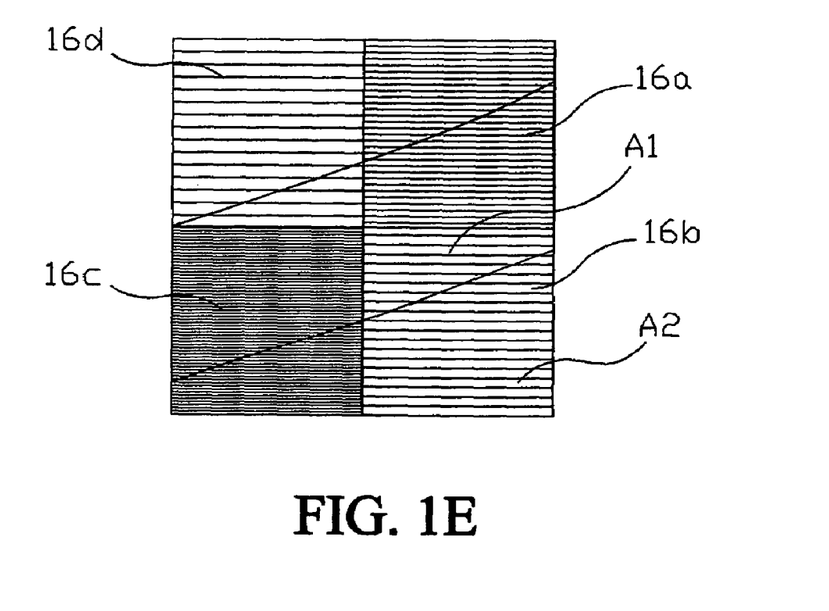

Consequently, the entire pixel rows 18a–18d will be painted in the same shade of gray, as shown in 24, where the strokes 20 and 22 merge together and are unrecognizable. FIG. 1C illustrates a severely degraded version of the character 10' corresponding to the character 10 of FIG. 1A, which was rendered on a gray level screen according to the conventional method. As illustrated, the horizontally extending strokes in the portion 14 of the original character 10 have merged together to render the resulting character almost unrecognizable.

A need exists for a system, method, and computer-readable medium for generating fonts that will be displayed in high quality not only on a binary-image dot matrix screen but also on a gray level screen.

SUMMARY OF THE INVENTION

The present invention provides a system, method, and computer-readable medium for generating a silhouette-oriented gray font, which can be displayed (rendered) in high quality not only on a binary-image dot matrix screen but also on a gray level screen.

In accordance with one embodiment of the present invention, a method is provided for defining (generating) a set of basic strokes in silhouette-oriented representation, which will then be used for defining a set of characters. The method initially retrieves a set of characters, each consisting of one or more strokes. Some of these strokes are similarly shaped to form a set. For each set of similarly-shaped strokes, one "basic" stroke is defined which best represents the similarly-shaped strokes topographically, according to the method described in U.S. Pat. Nos. 5,852,448, 6,151,032, and 6,157,390, incorporated above. In other words, all strokes in the set of retrieved characters are topographically represented by at least one of the basic strokes. Each basic stroke is defined in terms of key points, width values, feature points, and curve ratios, as also described in U.S. Pat. Nos. 5,852,448, 6,151,032, and 6,157,390.

For each basic stroke, a font designer may assign a silhouette code that defines what portion(s) of the basic stroke should be subjected to a gray value calculation (e.g., what portion of the basic stroke should be used to calculate the occupied area within each pixel in Equation 1 above). For example, the silhouette code may define that only an upper portion or a lower portion of a horizontally extending basic stroke is to be subjected to a gray value calculation. The area subjected to a gray value calculation is called a silhouette area. The font designer selects a suitable silhouette code for each basic stroke so that the basic stroke, and all the similarly-shaped strokes represented by the basic stroke, will appear properly when rendered on a gray level screen. In one embodiment of the present invention, the silhouette code assigned to each basic stroke will then be automatically assigned to all of the similarly-shaped strokes that are topographically represented by that basic stroke. Thereafter, the font designer visually confirms that all characters, each consisting of one or more strokes each of which is assigned a silhouette code, appear properly when rendered on a gray level screen. If not, the font designer redefines the silhouette codes for the basic strokes (and hence for all the similarly-shaped strokes topographically represented by each of the basic strokes) until all the characters appear properly when rendered on a gray level screen. Once the proper appearance of all the characters is confirmed, the font designer stores the basic strokes in association with their silhouette codes.

In accordance with one aspect of the invention, the steps included in the method for defining basic strokes in silhouette-oriented representation may be performed manually using a computer graphical user interface tool, or automatically or semi-automatically using suitable image analysis techniques. In this regard, the invention also provides a computer graphical user interface tool and a computer-readable medium including instructions for performing various embodiments of the method.

In accordance with another aspect of the invention, a method is provided for rendering characters in silhouette-oriented representation. Each character consists of one or more strokes, and each stroke is defined in terms of key points, width values, feature points, curve ratios, and also a silhouette code, as described above. For each stroke forming the character, the method renders the outline of the stroke according to the key points, width values, feature points, and curve ratios. Also, a silhouette code assigned to each stroke is used to determine the "silhouette area" of the stroke that will be projected onto each pixel to define the occupied area in each pixel. The occupied area in each pixel will then be used in a gray value calculation to determine the gray value of the pixel. Finally, the method fills (paints) each pixel according to the calculated gray value.

The present invention further offers an anti-aliasing method for use during rendering to reduce jaggedness in the rendered text image. The anti-aliasing method involves analyzing an image topography surrounding each pixel. Then, a matrix of weights that is predefined to produce an optimal anti-aliasing effect is selected based on the analyzed topography. Thereafter, the selected matrix of weights is used to calculate the anti-aliased gray value for the pixel.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

Figure 2:
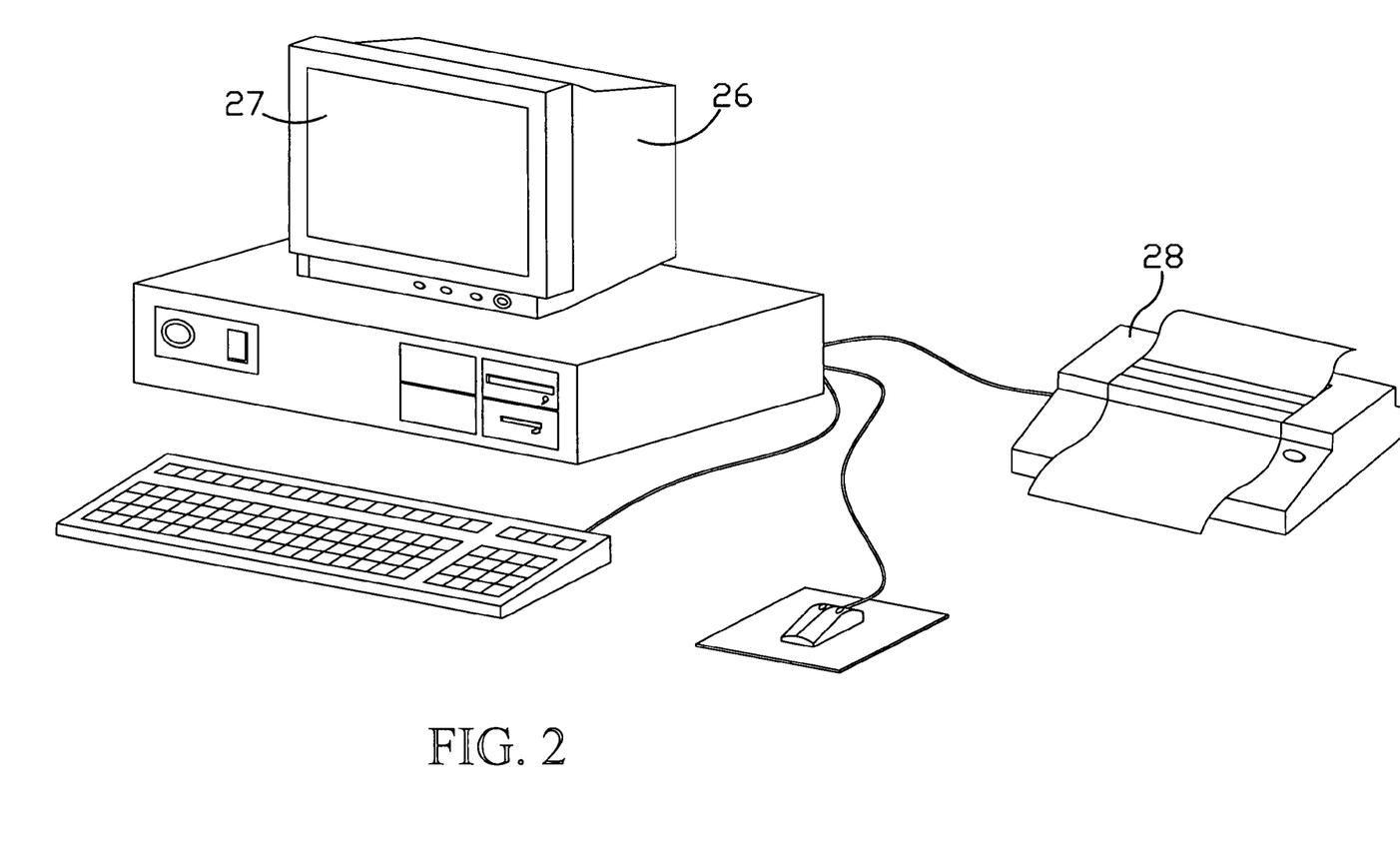
FIG. 2 is a block diagram depicting a system or graphical computer user interface tool suitable for use in practicing a method of the present invention.

FIG. 2 illustrates a typical computing environment, in which various methods of the present invention may be implemented. A general purpose digital computer 26 including a display 27 and attached to a printing device 28 is fully capable of carrying out various methods of the present invention. The display 27, the printing device 28, and any other output device (monitor, plotter, etc.) may display, print, and otherwise output the font generated in accordance with the present invention. Other types of computing systems, such as networked or mainframe-based systems, may also be used to carry out methods of the present invention, as apparent to those skilled in the art.

While the following describes the present invention as applied to defining and rendering characters each consisting of one or more strokes, it should be understood that the present invention is equally applicable to defining and rendering characters each consisting of one or more glyphs. As discussed in the background section above, a glyph is a subunit of a character and consists of one or more strokes. Both strokes and glyphs are defined similarly in terms of key points, width values, features points, and curve ratios. Therefore, it should be appreciated by those skilled in the art that the following discussion directed to defining and rendering characters according to basic strokes are readily extendible to defining and rendering characters according to basic glyphs. Thus, as used herein and as long as the context permits, the term "stroke" encompasses both stroke and glyph.

Figure 3A:
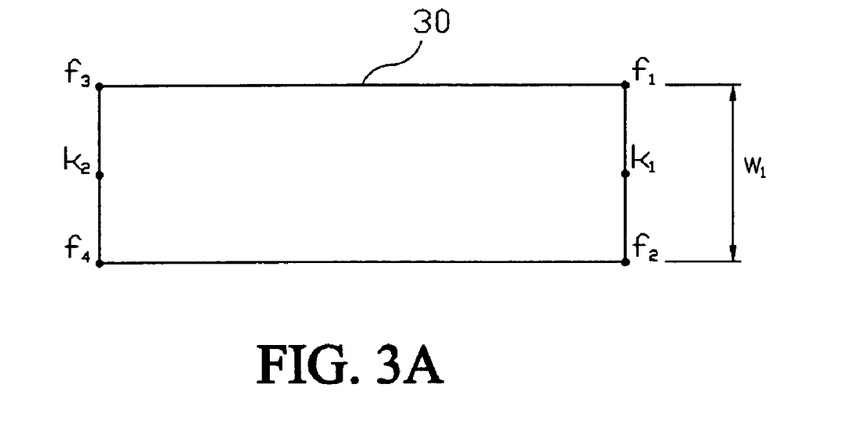
FIGS. 3A–3C schematically illustrate a basic stroke defined in terms of key points, width values, and feature points, and further illustrate assigning a silhouette code to each stroke according to one embodiment of the present invention.

FIG. 3A illustrates a basic stroke 30 defined based on key points ($K_1$ and $K_2$), width values ($W_1$), feature points (f1, f2, f3, and f4), and curve ratios (not shown), as described in U.S. Pat. Nos. 5,852,448, 6,151,032, and 6,157,390, incorporated above. As described in detail in the incorporated patents, one of the characteristics of Asian languages is that many strokes are shared by many characters. In other words, similarly-shaped strokes, for example the horizontally extending line stroke 30 as shown in FIG. 3A, are used in multiple characters. Also, as exemplified by the strokes 20 and 22 in the character 10 of FIG. 1A, multiple strokes that are similarly shaped may be used in a single character. As also described in the incorporated patents, each set of similarly-shaped strokes can therefore be topographically represented by a "basic stroke." Each basic stroke is first defined by key points and width values. Key points ($K_1$ and $K_2$) are placed at edges or intersecting or bent portions of the basic stroke, so that moving the key points will change the outline shape of the basic stroke. Width values ($W_1$) are also placed at locations within the basic stroke so that changing the width values will change the outline shape of the basic stroke. Each basic stroke is also associated with equations that obtain feature points based on the key points and the width values. For the illustrated example of FIG. 3A, the equations for obtaining the feature points ($f_1$, $f_2$, $f_3$, and $f_4$) may be as follows:

$$f_1 = K_1 + W_1/2$$

$$f_2 = K_1 - W_1/2$$

$$f_3 = K_2 + W_1/2$$

$$f_4 = K_2 - W_1/2 \quad \text{(Equations 3)}$$

As such, feature points have predefined spatial relationship to the key points and width values. As shown, feature points are generally placed on the basic stroke's outline at locations where the outline changes its direction or curvature. Further, each basic stroke is associated with curve ratios that are preferably defined according to various resolution levels, and designed to create curve segments between two consecutive feature points depending on the resolution level of a particular output device. The details concerning the use of curve ratios are also disclosed in the incorporated patents.

Each basic stroke is assigned a stroke ID value. Each of the defined basic strokes can then be used to define other strokes having similar shapes to the basic stroke, by moving the key points and changing the width values. When the key points and width values are changed to slightly modify the shape of a basic stroke to thereby define a new shape for a particular stroke, their associated feature points will be automatically recalculated based on the equations associated with the basic stroke (e.g., Equations 3 above). Further, new curve segments will be created between recalculated feature points according to the predefined curve ratios and depending on the resolution level of an output device. The details concerning defining similarly-shaped strokes based on a basic stroke are also disclosed in the incorporated patents.

As described in the background section above, when strokes are defined for rendering on a binary-image dot matrix screen and are then rendered on a gray level screen, the text image quality may be severely degraded. Thus, according to one embodiment of the present invention, each basic stroke (and hence all similarly-shaped strokes topographically represented by the basic stroke) is further assigned a silhouette code, which defines the silhouette distribution or "silhouette area" within each stroke.

Figure 3B:
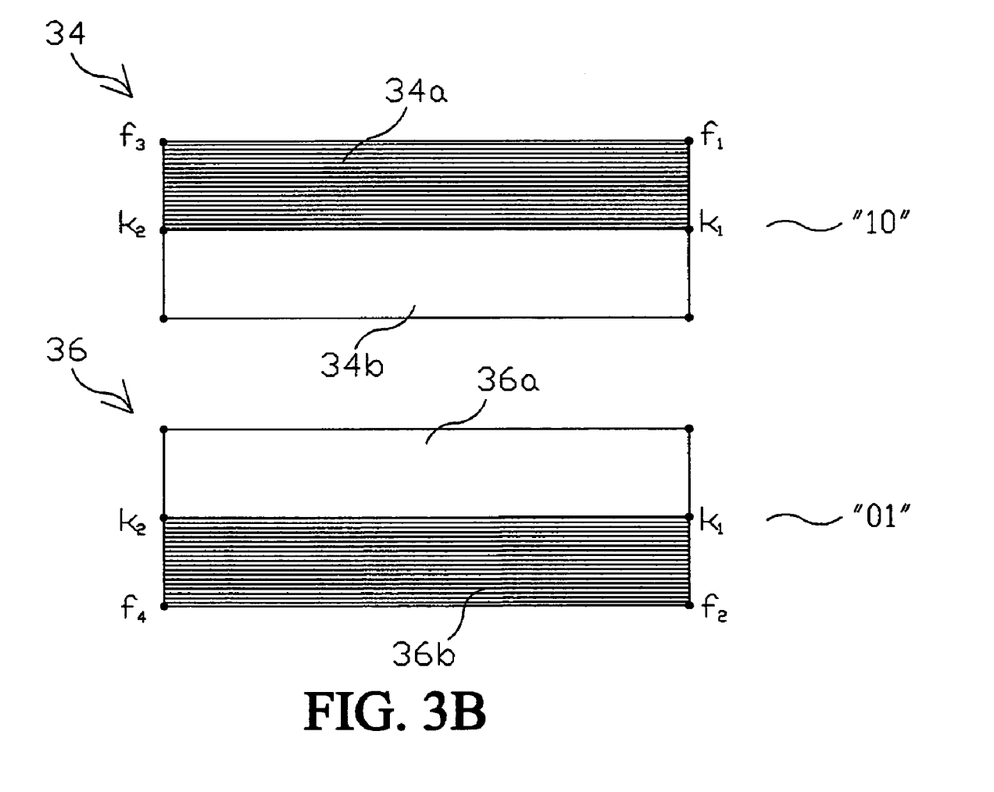

FIG. 3B illustrates assigning two different silhouette codes "10" and "01" to two strokes 34 and 36, respectively. A silhouette code is used to define a silhouette area (or gray area) within each stroke, which will be projected onto pixels of a gray level screen and therefore used in a gray level calculation for each pixel. In the illustrated example, the stroke 34 is assigned a silhouette code "10," which in this case means that its upper half portion 34a surrounded by the points ($K_1$, $f_1$, $f_3$, $K_2$) is a "silhouette area" subject to a gray value calculation upon rendering. In other words, the silhouette area can be defined in terms of key points, width values, features points, and curve ratios, similarly to how the outline of each stroke is defined. On the other hand, the lower half portion 34b is not a "silhouette area" and therefore will not cause shading of any pixels onto which the portion 34b falls (i.e., the portion 34b will not be considered projected onto any pixels for the purpose of a gray value calculation). The stroke 36 is assigned a silhouette code "01," which in this case means that its upper half portion 36a is a non-silhouette area while its lower half portion 36b surrounded by the points ($K_1$, $K_2$, $f_4$, $f_2$) is a silhouette area subject to a gray value calculation upon rendering. It should be understood by those skilled in the art that the foregoing description of silhouette codes is merely exemplary, and silhouette areas may be defined in various other manners, depending on the shape of each basic stroke and also depending on each application. For the purpose of the present description, a silhouette code means any indication associated with each stroke to designate which portion or portions of the stroke are to be subjected to a gray value calculation. The silhouette code of each stroke is then stored in association with the stroke ID.

Figure 3C:
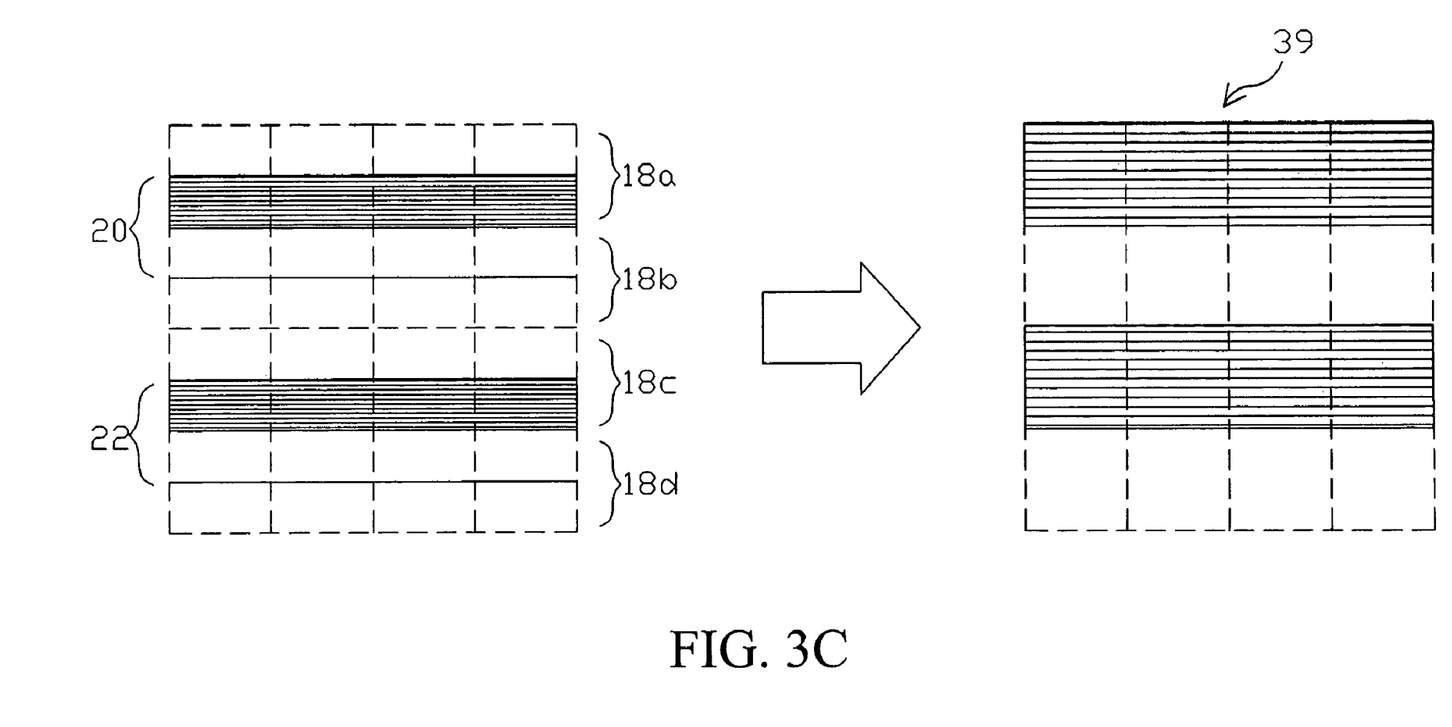

FIG. 3C illustrates the two strokes 20 and 22, as in the character 10 of FIG. 1A, each assigned a silhouette code of "10" in the example of FIG. 3B, as rendered on a gray level screen consisting on four pixel rows 18a–18d. Because each of the strokes is assigned code "10" and thus only its upper half portion is subjected to a gray value calculation to determine a gray value for each pixel, the two strokes can be rendered visually distinguishable from each other as shown in 39. This result is possible because any pixel, onto which the lower half non-silhouette area of each stroke falls, is not subjected to a gray value calculation and thus will be painted in a default color, such as white. Thus, the characters consisting of strokes defined in silhouette-oriented representation can be rendered properly, even on a gray level screen. For example, the silhouette-oriented representation technique outlined above can be used to avoid merging of the strokes 20 and 22 in the character 10 of FIG. 1A.

Figure 4:
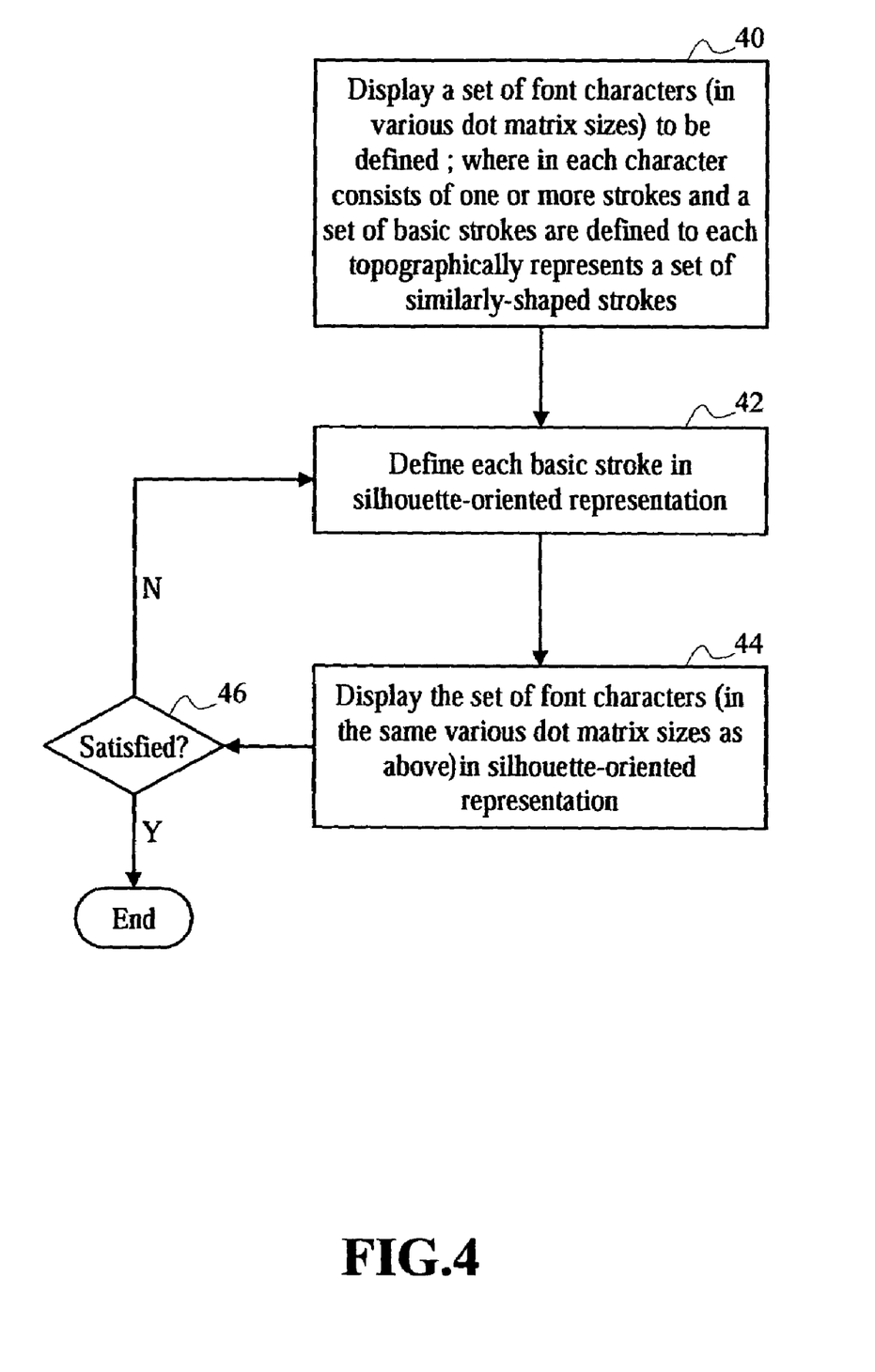
FIG. 4 is a flow chart depicting a method of defining a silhouette-oriented gray font in accordance with one embodiment of the present invention.

FIG. 4 is a flowchart depicting a method of defining (constructing or generating) a set of basic strokes in silhouette-oriented representation, which will then be used for defining a set of characters. At block 40, a font designer displays a set of characters (in various dot matrix sizes) to be defined in silhouette-oriented representation. A font designer is typically a graphics designer attempting to create a font database for commercial use. Each character in the set consists of one or more strokes, and all the strokes can be divided into sets of similarly-shaped strokes. For each set of similarly-shaped strokes, one basic stroke that best represents the similarly-shaped strokes topographically is predefined in terms of key points, width values, feature points, and curve ratios.

At block 42, the font designer defines each basic stroke in silhouette-oriented representation. For example, the designer manually (visually) ascertains how to best define a silhouette area within each stroke in view of how the strokes represented by the basic stroke appear in relation to other strokes within each character. In one example, if a stroke is situated adjacent to another stroke within a character, then the side of the first stroke closer to the second stroke should be designated as a non-silhouette area to avoid merging. Then, a suitable silhouette code corresponding to the selected designation of a silhouette area and non-silhouette area is assigned to the basic stroke. The silhouette code assigned to each basic stroke may then be automatically assigned to all similarly-shaped strokes that are topographically represented by that basic stroke.

At block 44, the font designer displays the set of characters in silhouette-oriented representation. Specifically, each of the strokes included in the characters is associated with a silhouette code, and thus each stroke is rendered according to the silhouette code on a gray level screen. In other words, only the pixel area occupied by the silhouette area within each stroke is used in a gray level calculation to obtain a gray value for the pixel.

At block 46, the font designer visually confirms if all the characters are rendered properly, i.e., no strokes are merging together or otherwise rendered to make the resulting character unrecognizable. If the font designer is satisfied, the method of defining a set of font characters ends.

On the other hand, if the font designer is not satisfied, then returning to block 42, the designer re-defines at least some of the basic strokes in silhouette-oriented representation, by modifying the designation of a silhouette area and/or a non-silhouette area. As before, the same definition of a silhouette area within a basic stroke may then be automatically assigned to all of the strokes that are topographically represented by the basic stroke. Then, at block 44, the font designer displays the redefined set of characters in silhouette-oriented representation, and at block 46, the designer visually confirms if all the redefined characters are rendered properly on a gray level screen. This process is repeated until the designer is satisfied with the rendered appearance of the characters set at block 46.

Figure 5:
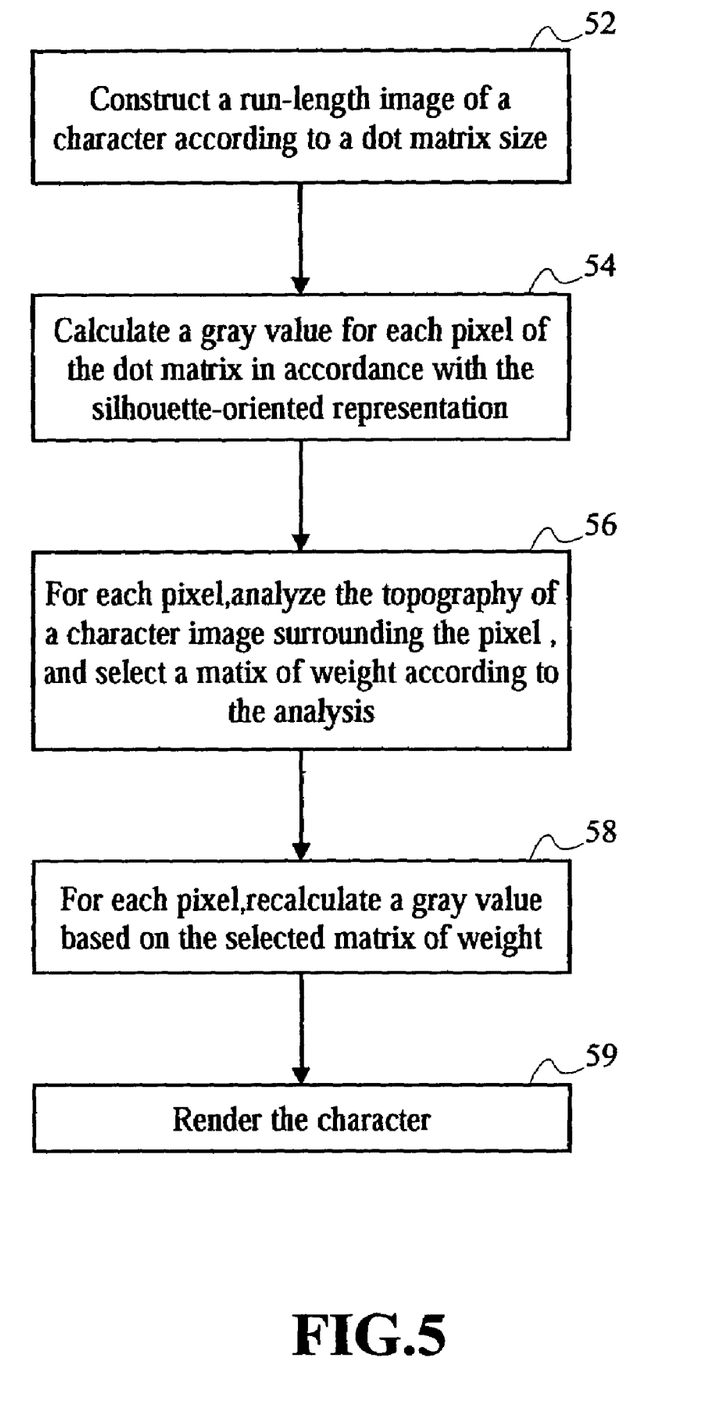
FIG. 5 is a flow chart depicting a method of rendering a silhouette-oriented gray font in accordance with one embodiment of the present invention.

In accordance with another aspect of the invention, a method of rendering (displaying) characters in silhouette-oriented representation is provided. FIG. 5 is a flowchart depicting one example of such a method. For example, the method of FIG. 5 may be used in block 42 of FIG. 4. The steps shown in FIG. 5 are performed by an image-rendering program/engine in a computer for displaying a character on a gray value output device, such as a gray level screen.

Figure 6A:
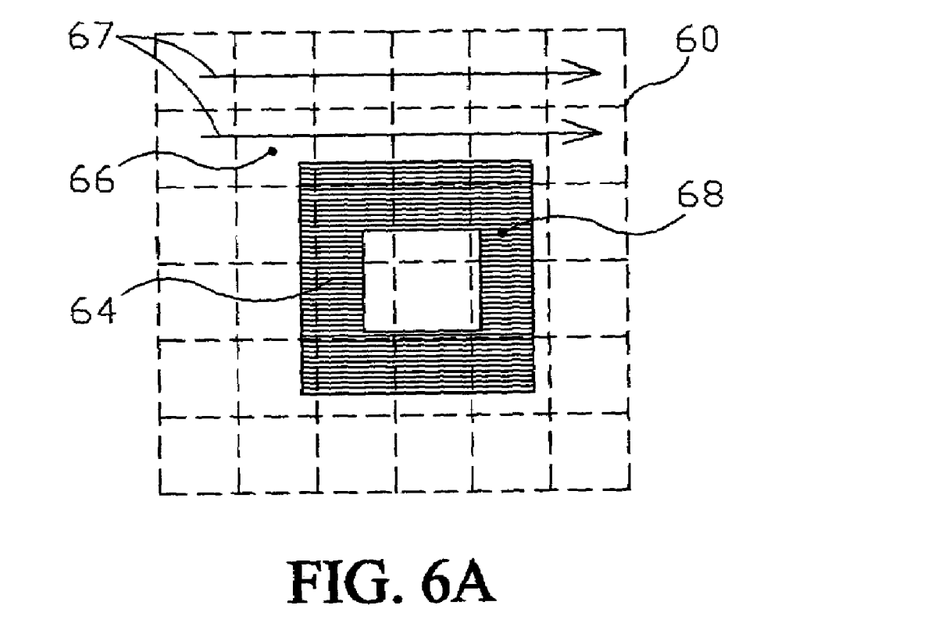
FIGS. 6A–6D schematically illustrate an anti-aliasing method for reducing jaggedness in a rendered character image according to one embodiment of the present invention.

At block 52, the method constructs a run-length image of a character to be rendered according to a particular dot matrix size. Referring additionally to FIG. 6A, for example, on a 6×6 dot matrix 60, a run length image is constructed by scanning pixels along arrows 67. In the illustrated example, a Chinese character image 64 is to be rendered on the dot matrix 60.

At block 54 of FIG. 5, for each pixel in the dot matrix 60, a suitable algorithm is used to obtain a gray value for the pixel according to the silhouette-oriented representation. For example, Equation 1 may be used, though it should be noted that only the area projected by the silhouette area within each stroke constitutes "A1" in Equation 1. The calculated gray value for each pixel can then be used to render the character at block 59.

Figure 6B:
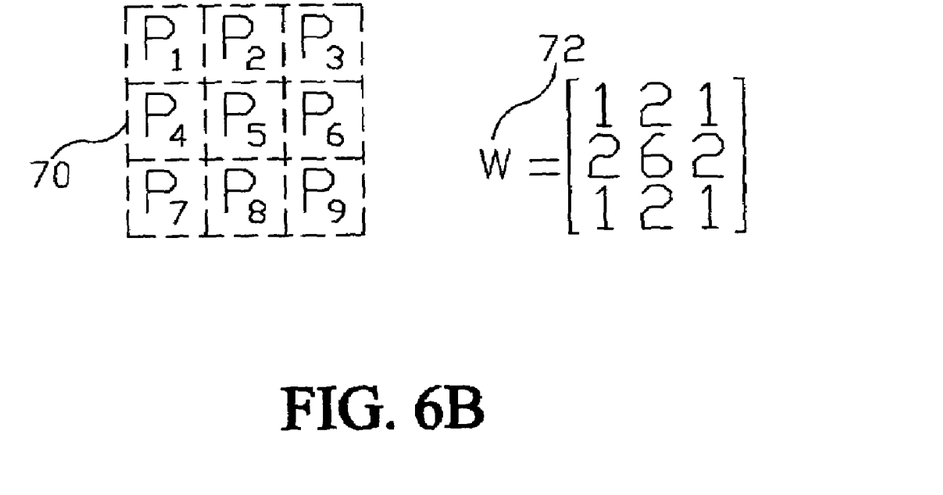

Optionally, an anti-aliasing method may be carried out to reduce any jaggedness in the rendered character image according to one embodiment of the present invention. The anti-aliasing method is performed at blocks 56 and 58 of FIG. 5. Various methods are known in the art to reduce aliasing (i.e., jaggedness) in an image upon rendering. FIG. 6B schematically illustrates one such method, wherein each of the nine pixels $P_1$–$P_9$ in a 3×3 pixel region 70 has an assigned gray value, and the gray value of a central pixel $P_5$ is to be recalculated for anti-aliasing purposes. The gray value of each of the nine pixels $P_1$–$P_9$ was calculated according to a suitable algorithm, as in block 54 of FIG. 5 above. To obtain the anti-aliased gray value for the central pixel $P_5$, a gray value of each pixel in the pixel region 70 surrounding the central pixel $P_5$ is multiplied by a predetermined weight, collectively shown in a matrix of weight, W (72); then, a sum of all the multiplications is divided by a sum of all the weights, as below:

$$\text{gray value of a central pixel} = \frac{\sum_{i=1}^{9}[(\text{gray value of } Pi) \times Wi]}{\sum_{i=1}^{9} Wi} \quad \text{(Equation 4)}$$

As known in the art, the matrix of weight W is typically defined in accordance with a Gaussian distribution. In the prior art method, the same matrix of weight is used to calculate an anti-aliased gray value for all pixels.

In accordance with the present invention, multiple matrices of weight are predefined to each correspond with a particular topography of a character image surrounding a pixel. Specifically, at block 56 of FIG. 5, for each pixel, the topography of a character image surrounding the pixel is analyzed, and one matrix of weight that is predefined to produce optimal anti-aliasing effects for this particular type of topography is selected. Then, at block 58, the selected matrix of weight is used to calculate an anti-aliased gray value for the pixel.

Figure 6C:
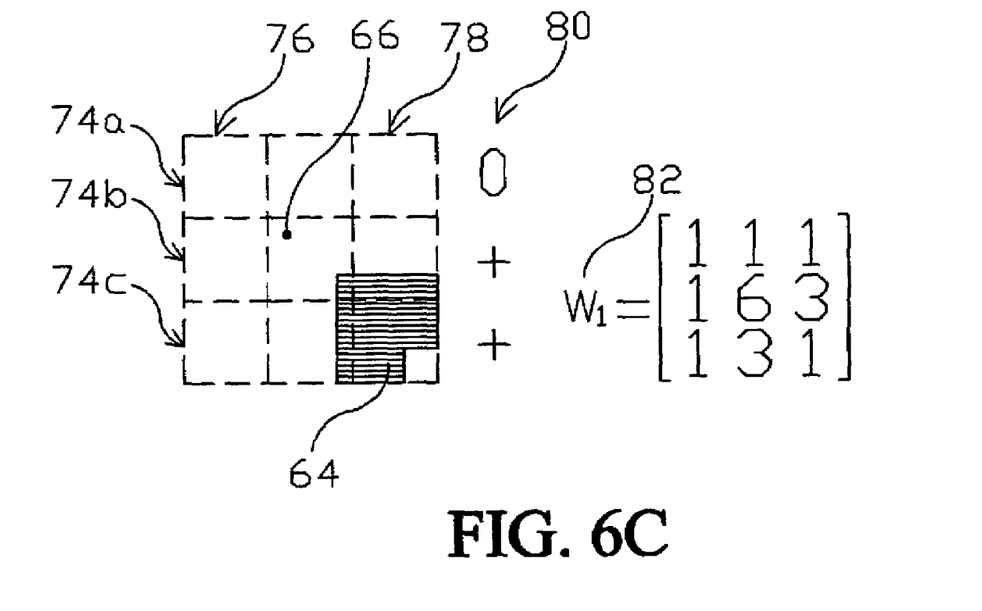
Figure 6D:
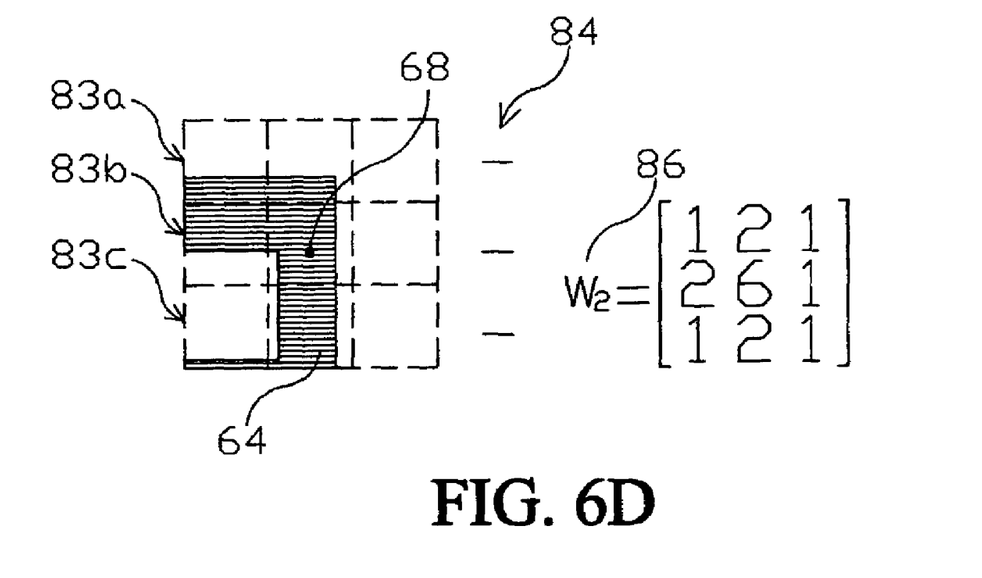

Referring additionally to FIG. 6A, consider pixels 66 and 68 onto which a part of the character image 64 is to be rendered. FIGS. 6C and 6D illustrate a method of calculating an anti-aliased gray value for the pixels 66 and 68, respectively.

In FIG. 6C, a 3×3 pixel region surrounding the pixel 66 is considered, and the topography of the character image 64 centered around the pixel 66 is analyzed. This can be done, for example, by considering each of three pixel rows 74a, 74b, and 74c, separately, by subtracting the gray value of the left most pixel 76 from the gray value of the right most pixel 78. The resulting value can be categorized as zero, positive, or negative, as shown in 80, and these three values can collectively form a topographical index for this pixel region. In the example of FIG. 6C, the topographical index is [0, +, +], which is indicative of the general topography of this pixel region. Based on the particular type of topographical index, a matrix of weight $W_1$ (82) can be selected, which is predefined to produce an optimal anti-aliasing result for this type of topography. Thereafter, an anti-aliased gray value of the central pixel 66 is calculated according to Equation 4 above, but using the new matrix of weight $W_1$ (82).

Similarly, in FIG. 6D, a 3×3 pixel region surrounding the pixel 68 is considered, and the topography of three pixel rows 83a, 83b, and 83c can be summarized as a topographical index 84 of [−, −, −]. Based on the topographical index 84, a matrix of weight $W_2$ (86) that is predefined to produce an optimal anti-aliasing effect for the type of topography represented by the index 84 is selected. Then, an anti-aliased gray value for the central pixel 68 is calculated according to Equation 4 above, but using the new matrix of weight $W_2$ (86). It should be understood by those skilled in the art that various other methods of determining and analyzing the topography of a character image using suitable image analysis techniques are possible, and are within the scope of the present invention. Further, an optimal matrix of weight for a particular type of topography can be defined using various image analysis techniques and/or empirically.

Various methods of the present invention may be practiced using a graphical user interface (GUI) CAD tool. For example, a GUI tool for use in a Windows®-based operating system may be used, though a GUI tool can be implemented in various other types of operating systems. It is also noted that one or more steps of any method performed by a CAD tool can be performed automatically using image analysis techniques.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of constructing a set of characters to be displayed in gray scale, wherein each character comprises one or more strokes/glyphs and each stroke/glyph is defined in silhouette-oriented representation, comprising:
    (a) displaying a set of characters to be displayed in gray scale, each of the set of characters comprising one or more strokes/glyphs, all of the strokes/glyphs being represented by a set of basic strokes/glyphs, each basic stroke/glyph topographically representing a set of similarly-shaped strokes/glyphs;
    (b) defining each of the set of basic strokes/glyphs in silhouette-oriented representation, wherein each basic stroke/glyph is assigned a silhouette code that defines a silhouette area corresponding to a portion of the basic stroke/glyph to be subjected to a gray level calculation;
    (c) defining each of the one or more strokes/glyphs that are topographically represented by the set of basic strokes/glyphs, in silhouette-oriented representation;
    (d) rendering the set of characters in gray scale;
    (e) verifying the appearance of the set of characters;
    (f) if the appearance of the set of characters is not satisfactory, returning to step (b); and
    (g) repeating steps (a) through (f) above until the appearance of the set of characters is verified.

2. The method of claim 1, wherein each of the strokes/glyphs forming the set of characters is defined in terms of key points, width values, feature points that have predefined spatial relationship to the key points and width values, and curve ratios that define curves between the feature points.

3. The method of claim 1, wherein step (c) comprises assigning the same silhouette code assigned to each of the set of basic strokes/glyphs to all similarly-shaped strokes/glyphs that are topographically represented by that basic stroke/glyph.

4. The method of claim 1, wherein each of the strokes/glyphs forming the set of characters is defined in terms of key points, width values, feature points that have predefined spatial relationship to the key points and width values, and curve ratios that define curves between the feature points, and similarly, each of the set of basic strokes/glyphs is defined in terms of key points, width values, feature points, and curve ratios, and step (b) comprises defining the silhouette area within each of the set of basic strokes/glyphs in terms of key points, width values, feature points, and curve ratios.

5. The method of claim 1, wherein step (d) of rendering the set of characters in gray scale comprises:
    calculating a gray value for each pixel onto which any silhouette area falls;
    for each pixel, analyzing a topography of a character image surrounding the pixel, selecting a predefined matrix of weight according to the analysis, and calculating an anti-aliased gray value for the pixel based on the selected matrix of weight; and
    rendering each pixel according to its anti-aliased gray value.

6. A computer graphical user interface tool for constructing a set of characters for display in gray scale, wherein each character comprises one or more strokes/glyphs and each stroke/glyph is defined in silhouette-oriented representation, comprising:
    means for displaying a set of characters in gray scale, each of the set of characters comprising one or more strokes/glyphs, all of the strokes/glyphs being represented by a set of basic strokes/glyphs, each basic stroke/glyph topographically representing a set of similarly-shaped strokes/glyphs;
    means for defining each of the set of basic strokes/glyphs in silhouette-oriented representation, wherein each basic stroke/glyph is assigned a silhouette code that defines a silhouette area corresponding to a portion of the basic stroke/glyph to be subjected to a gray level calculation; and
    means for defining each of the one or more strokes/glyphs that are topographically represented by the set of basic strokes/glyphs, in silhouette-oriented representation.

7. The tool of claim 6, wherein the means for defining each of the one or more strokes/glyphs automatically defines each of the one or more strokes/glyphs in silhouette-oriented representation according to the silhouette-oriented representation of a basic stroke/glyph that topographically represents that stroke/glyph.

8. The tool of claim 6, wherein each of the strokes/glyphs forming the set of characters is defined by key points, width values, feature points that have predefined spatial relationship to the key points and width values, and curve ratios that define curves between the feature points, and similarly, each of the set of basic strokes/glyphs is defined by key points, width values, feature points, and curve ratios, and the means for defining each of the set of basic strokes/glyphs in silhouette-oriented representation defines a silhouette area within each of the set of basic strokes/glyphs in terms of key points, width values, feature points, and curve ratios.

9. The tool of claim 6, wherein the means for displaying a set of characters in gray scale further comprises:
    means for calculating a gray value for each pixel;
    means for analyzing a topography of a character image surrounding each pixel, for selecting a predefined matrix of weight according to the analysis, and for calculating an anti-aliased gray value for the pixel based on the selected matrix of weight; and
    means for rendering each pixel according to its anti-aliased gray value.

10. A computer-readable medium having computer-executable instructions for constructing a set of characters for display in gray scale, wherein each character comprises one or more strokes/glyphs and each stroke/glyph is defined in silhouette-oriented representation, the instructions when loaded into a computer causing the computer to execute the steps of:
    (a) displaying a set of characters to be displayed in gray scale, each of the set of characters comprising one or more strokes/glyphs, all of the strokes/glyphs being represented by a set of basic strokes/glyphs, each basic stroke/glyph topographically representing a set of similarly-shaped strokes/glyphs;
    (b) permitting a user to define each of the set of basic strokes/glyphs in silhouette-oriented representation, wherein each basic stroke/glyph is assigned a silhouette code that defines a silhouette area corresponding to a portion of the basic stroke/glyph to be subjected to a gray level calculation;

(c) defining each of the one or more strokes/glyphs forming each of the set of characters in silhouette-oriented representation; and (d) rendering the set of characters in gray scale.

11. The medium of claim 10, wherein each of the strokes/glyphs forming the set of characters is defined in terms of key points, width values, feature points that have predefined spatial relationship to the key points and width values, and curve ratios that define curves between the feature points.

12. The medium of claim 10, wherein step (c) comprises assigning the same silhouette code assigned to each of the set of basic strokes/glyphs to all similarly-shaped strokes/glyphs that are topographically represented by that basic stroke/glyph.

13. The medium of claim 10, wherein each of the strokes/glyphs forming the set of characters is defined in terms of key points, width values, feature points that have predefined spatial relationship to the key points and width values, and curve ratios that define curves between the feature points, and similarly, each of the set of basic strokes/glyphs is defined in terms of key points, width values, feature points, and curve ratios, and step (b) comprises defining the silhouette area within each of the set of basic strokes/glyphs in terms of key points, width values, feature points, and curve ratios.

14. The medium of claim 10, wherein step (d) of rendering the set of characters in gray scale comprises:

calculating a gray value for each pixel;

for each pixel, analyzing a topography of a character image surrounding the pixel, selecting a predefined matrix of weight according to the analysis, and calculating an anti-aliased gray value for the pixel based on the selected matrix of weight; and rendering each pixel according to its anti-aliased gray value.

* * * * *